United States Patent
Mito et al.

(10) Patent No.: US 6,589,894 B1
(45) Date of Patent: *Jul. 8, 2003

(54) COMPOSITION CONTAINING LEAD-OXIDE FREE GLASS POWDER OF LOW SOFTENING POINT USEFUL FOR BARRIER RIB IN PDP

(75) Inventors: Takayuki Mito, Shiga (JP); Hiroyuki Oshita, Otsu (JP); Masahiko Ouji, Moriyama (JP); Kazuo Hadano, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/659,750

(22) Filed: Sep. 11, 2000

(51) Int. Cl.⁷ ............... C03C 3/066; C03C 8/04; C03C 8/16
(52) U.S. Cl. ............... 501/17; 501/18; 501/20; 501/26; 501/32; 501/79
(58) Field of Search ............... 501/17, 18, 20, 501/26, 32, 49, 79

(56) References Cited

U.S. PATENT DOCUMENTS

| | | | | |
|---|---|---|---|---|
| 4,256,796 A | * | 3/1981 | Hang et al. | |
| 5,306,674 A | * | 4/1994 | Ruderer et al. | 501/70 |
| 5,342,810 A | * | 8/1994 | Merigaud et al. | 501/26 |
| 6,362,119 B1 | * | 3/2002 | Chiba | 501/15 |
| 6,417,123 B1 | * | 7/2002 | Fukushima et al. | 501/32 |

FOREIGN PATENT DOCUMENTS

| | | | |
|---|---|---|---|
| JP | 11228178 A | * | 8/1999 |
| JP | 2000095544 A | * | 4/2000 |
| JP | 2000226232 A | * | 8/2000 |

* cited by examiner

*Primary Examiner*—David Sample
(74) *Attorney, Agent, or Firm*—Collard & Roe, P.C.

(57) ABSTRACT

In a composition for use in formation of barrier ribs in a plasma display panel, comprising glass powder, the glass powder is powder of PbO free and alkali metal oxide free glass which consists essentially of, by molecular percent, 5–40% BaO, 20–55% ZnO, 15–50% $B_2O_3$, 0–25% $SiO_2$. The glass has a softening point of 630° C. or less. Ceramics powder is mixed with the glass powder. The composition can also be provided in a form of paste, alternatively in a form of a green sheet.

11 Claims, No Drawings

COMPOSITION CONTAINING LEAD-OXIDE FREE GLASS POWDER OF LOW SOFTENING POINT USEFUL FOR BARRIER RIB IN PDP

BACKGROUND OF THE INVENTION

This invention relates to dielectric material useful in plasma display panels (PDPs) and, in particular, to a composition used for forming barrier ribs in PDPs.

A plasma display panel is known as a self-luminescent type flat display having excellent properties of such as a small weight, a thin type etc. and draws considerable attention because of its possibility of a large screen face.

Generally speaking, a PDP has a front glass plate on which a plurality of electrodes are disposed for generating plasma discharge by cooperation with electrodes deposited on a rear glass plate confronting the front glass plate with a gap therebetween. A plurality of barrier ribs (which will simply be referred to as "ribs" hereinafter) are formed in the gap to define and maintain the gap between the front and rear glass plates. The ribs are also serve for partitioning the gap into a plurality of discharge spaces for emitting R (red), G (green) and B (blue) lights.

Each of the ribs is formed by firing a mixture of glass powder and ceramics powder as fillers. In order to avoid deformation of the rear glass plates during the firing of the mixture, the mixture is desired to be able to be fired at about 600° C. or less. To this end, glass having a softening point of 630° C. or less is usually used for the glass powder. The glass contains PbO and/or alkali metal oxide for lowering the softening point of the glass.

However, the glass containing PbO has problems in that PbO badly affects to the health of workers handling the glass powder as well as in the environmental pollution by waste of the glass.

On the other hand, the use of alkali metal oxide is desirably avoided in the glass for ribs in PDP because alkali metal badly affects to electrical properties of electric and electronic components.

SUMMARY OF THE INVENTION

It is an object of this invention to provide a glass for use in composition useful for forming the ribs in PDP which is free of PbO but has a low softening point of 630° C. or less.

It is an object of this invention to provide a glass for use in composition useful for forming the ribs in PDP which is free of alkali metal oxide but has a low softening point of 630° C. or less.

It is a further object of this invention to provide a composition for use in formation of ribs in PDP which comprises the PbO free and alkali metal oxide free glass powder and filler powder.

According to this invention, a glass for use in a material for forming ribs in a plasma display panel is obtained, which consists essentially of, by molecular percent, 5–40% BaO, 20–55% ZnO, 15–50% $B_2O_3$, 0–25% $SiO_2$.

The glass preferably has a softening point of 630° C. or less.

The glass is free of PbO and free of alkali metal oxide.

According to another aspect of this invention, a composition for use in formation of barrier ribs in a plasma display panel is obtained. The composition comprises powder material which consists essentially, by weight percent, 50–95% glass powder and 5–50% ceramic filler powder. The glass consists essentially of, by molecular percent, 5–40% BaO, 20–55% ZnO, 15–50% $B_2O_3$, 0–25% $SiO_2$, the glass being PbO free and alkali metal oxide free and having a softening point of 630° C. or less.

According to an embodiment of this invention, the composition further comprises binder, plasticizer, and solvent to form a paste. The paste comprises, by weight, the powder material of 30–90%, the binder of 0.1–20%, the plasticizer of 0–10%, and the solvent of 10–30%.

The binder is at least one selected from a group of poly butyl methacrylate, polyvinyl butyral, poly methyl methacrylate, poly ethyl methacrylate, and ethyl cellulose. The plasticizer is at least one selected from a group of butyl benzyl phthalate, dioctyl phthalate, di-isooctyl phthalate, dicapryl phthalate, dibutyl phthalate.

The solvent is at least one selected from a group of terpineol, diethylene glycol monobutyl ether acetate, and 2,2,4-trymethyl-1,3-pentanediolmonoisobutylate.

According to another embodiment, the composition further comprises binder and plasticizer to form a green sheet. The green sheet comprises, by weight, the powder material of 60–80%, the binder of 5–30%, and the plasticizer of 0–10%.

DESCRIPTION OF THE PREFERRED EMBODIMENT

In order to use in a material for forming ribs in a plasma display panel, this invention uses BaO—ZnO—$B_2O_3$ glass. The amount of ingredients in the glass is restricted in amounts so as to realize a softening point of 630° C. or less. Further, ZnO in the glass is increased in an amount comparing to the usual ZnO amount in BaO—ZnO—$B_2O_3$ glass so as to obtain a thermal expansion coefficient compatible with that of the front and rear glass plates of PDP.

In the glass, BaO is contained for lowering the softening point of the glass. The content of BaO is 5–40%, preferably 10–30%, by molecular percent. If the content is less than 5%, the softening point is not sufficiently lowered. The content more than 40% results in an elevated thermal expansion coefficient which is not compatible with the front and the rear glass plates of PDP.

ZnO is an element contained to lower the softening point and adjusting the thermal expansion coefficient of the glass. The content of ZnO is selected 20–55% by molecular percent, preferably 30–50%. When it is selected less than 20%, the intended function of ZnO is not effected. When it is more than 55%, the resultant glass has crystals therein and makes it difficult to produce a dense body of the rib by firing.

$B_2O_3$ is a glass forming element for widening a vitrification range. The content should be contained 15–50% by molecular percent, preferably 20–50%. $B_2O_3$ contents less than 15% makes vitrification difficult. When the content is more than 50%, the resultant glass has a softening point higher than 630° C., and cannot therefore produce a sense body of the rib by firing at a temperature of 600° C. or lower.

$SiO_2$ is also a glass forming element and should be selected, in content, 0–25% by molecular percent, preferably 2–15%. Use of $SiO_2$ more than 25% also results in a softening point higher than 6300° C., and cannot therefore produce a sense body of the rib by firing at a temperature of 600° C. or lower.

It is possible for certain objects to add other ingredients in the glass, for example, $Al_2O_3$, $ZrO_2$, $TiO_2$, alkali-earth metal oxide such as MgO, CaO, and SrO, for improving water and chemical resistance, and $P_2O_5$ for stabilizing the glass. The amount of the addition should be restricted up to 20%, preferably up to 15% in molecular percent.

The composition according to the present invention can include ceramics powder in addition to the glass powder to form a powdery admixture, so as to improve the mechanical strength of the fired layer. The ceramics powder comprises alumina, zircon, zirconia, titania, cordierite, mullite, silica, willemite, tin oxide, and zinc oxide. It is preferable that the maximum particle size Dmax of the ceramics powder is 15 μm or less.

In contents, the glass powder and the ceramics powder are 50–95% and 5–50% by weight, preferably 60–90% and 10–40% respectively. If the ceramic powder content is more than 50%, it is difficult to form the rib of a dense body by firing. Use of ceramics powder less than 5% results in lower strength of the rib fired.

In actual use, the composition according to this invention can be provided as a form of a paste or a green sheet.

In order to prepare the dielectric composition as a paste, the glass powder or the powdery admixture described above is mixed with binder, plasticizer and solvent. The glass powder alone and the powdery mixture will collectively be referred to as "powder material", hereinafter.

The paste comprises, by weight, the powder material of 30–90% preferably 50–80%, the binder of 0.1–20% preferably 0.5–10%, the plasticizer of 0–10% preferably 0–9%, and the solvent of 10–30% preferably 15–25%.

In use of the paste for forming ribs between the front and rear glass plates of a PDP, the paste is coated on the rear glass plate by the screen printing or the batch coating process to form a coating layer of a predetermined thickness. On the dried coating layer, dry film resist (DFR) is laminated, and then irradiated by ultraviolet ray through a mask. Then, a non-irradiated portion of the DFR is removed by the use of the alkaline developer to partially expose the coating layer. Thereafter, the exposed portion of the coating layer is removed by application of the sand blasting while remaining other potions to be formed into ribs. Then, DFR on the remained portion is removed by alkaline peeling solution and the remained portion is then fired to complete the formation of ribs. Then, the font glass is laid on and bonded to the ribs. Thus, the gap is defined between the front and rear glass plate.

The binder is used for strengthening the dried coating layer as well as providing softness to the layer. The binder is at least one selected from a group of poly butyl methacrylate, polyvinyl butyral, poly methyl methacrylate, poly ethyl methacrylate, and ethyl cellulose.

The plasticizer is for adjusting a drying speed of the coating layer and providing softness to the dried layer. The plasticizer is at least one selected from a group of butyl benzyl phthalate, dioctyl phthalate, di-isooctyl phthalate, dicapryl phthalate, dibutyl phthalate.

The solvent is used for dissolving or suspending the powder material, the binder and the plasticizer therein. The solvent is at least one selected from a group of terpineol, diethylene glycol monobutyl ether acetate, and 2,2,4-trymethyl-1,3-pentanediolmonoisobutylate.

In order to prepare the composition as a green sheet, the powder material is mixed with binder, plasticizer, and organic solvent such as toluene or toluole together with or without an auxiliary solvent such as isopropyl alcohol to form slurry. The slurry is coated on a film of, for example PET (polyethylene terephthalate) by the doctor blade method to form a thin layer. Thereafter, the layer is dried to remove the solvent to obtain the green sheet.

The green sheet comprises, by weight, the powder material of 60–80% preferably 65–77%, the binder of 5–30% preferably 10–25%, and the plasticizer of 0–10% preferably 0.1–7%.

The binder and the plasticizer used herein are the same as those described above in connection with preparation of the paste for providing softness and self-bonding property to the green sheet.

In use of the green sheet for forming the ribs on the rear glass plate, the green sheet is released from the film and then is laminated onto the rear glass plate. Thereafter, the green sheet is treated in the similar manner described above in connection with treatment of the coating layer of the paste. Thus, the ribs are formed on the rear glass plate.

Examples of this invention will be described below.

Table 1 demonstrates examples (sample Nos. 1–4) of this invention and comparative example (sample No. 5).

TABLE 1

| Sample No. | Invention | | | | Comparative Example |
|---|---|---|---|---|---|
| | 1 | 2 | 3 | 4 | 5 |
| Glass Composition (Molecular %) | | | | | |
| BaO | 23 | 30 | 20 | 15 | 15 |
| ZnO | 35 | 40 | 48 | 45 | 18 |
| $B_2O_3$ | 42 | 26 | 22 | 30 | 35 |
| $SiO_2$ | — | 2 | 10 | 10 | 32 |
| $P_2O_5$ | — | 2 | — | — | — |
| Thermal Expansion Coefficient ($\times 10^{-7}/°$ C.) | 85.0 | 87.1 | 79.5 | 77.6 | 72.1 |
| Softening Point (° C.) | 602 | 595 | 592 | 615 | 653 |
| Mixture (wt %) | | | | | |
| Glass Powder | 88 | 82 | 80 | 90 | 90 |
| Alumina Powder | 8 | 8 | 15 | 10 | 8 |
| Titania Powder | 4 | 6 | 5 | — | 2 |
| Zirconia Powder | — | 4 | 5 | — | — |
| Firing Quality | ○ | ○ | ○ | ○ | x |

Each of samples was prepared by the following steps.

A charge of raw materials was blended for each of samples shown in Table 1 and was melted in a platinum crucible at 1,250° C. for two hours. Then, a glass body was obtained from the molten glass, crushed and ground in an alumina ball mill, and classified by a screen having openings of 53 μm to obtain glass powder.

The thermal expansion coefficient and the softening point of the glass powder was measured and recorded. As seen from Table 1, samples 1–4 have the thermal expansion coefficient of 77.6–87.1 ($\times 10^{-7}/°$C.) and the softening point of 615° C. or less. Comparing to this, sample 5 has a high softening point of 653° C.

The glass powder of each of the samples was mixed with ceramics powder as shown in Table 1 to obtain a mixed powder thereof, which was examined in firing quality. Samples Nos. 1–4 were confirmed good in the firing quality but sample No. 5 could not provide a dense body fired.

The thermal expansion coefficient was measured according to JIS R 3102 at a temperature range of 30–3000° C. of a sample piece which was formed by the following steps. Each of the sample powders were press-formed, fired, and ground to form the sample piece of a cylindrical rod having a diameter of 4 mm and a length of 40 mm.

In measuring the softening point, a differential thermal analyzer of a macro type was used and values of the fourth inflection points were selected as the softening point.

The firing quality was examined by the following method. Each of samples was mixed with 5% terpineol solution and kneaded by three-roll mill to form a paste. The paste was coated onto a glass plate having a thermal expansion coefficient of 85 ($\times 10^{-7}$/°C.) by the screen process to form a coating layer having a thickness of 200 μm. Then, the coating layer was fired at 600° C. for ten minutes in an electric furnace to form a thin glass film. Then, ink oil was coated on the surface of the glass film and thereafter wiped out by use of alcohol. A sample on which the oil ink could be removed was decided good in the firing quality and is given with a mark ○ in Table 1. On the other hand, another sample in which oil ink soaked and was hardly removed was decided bad in the firing quality and is given with a mark × in table 1.

As described above, the composition of this invention can provide a dense body by firing at a temperature of 600 or less and is, therefore, useful for forming ribs on a rear glass plate of PDP as well as since it is contain neither PbO nor alkali metal oxide.

What is claimed is:

1. A glass for use in a material for forming barrier ribs in a plasma display panel, which consists essentially of, by molecular percent, 5–40% BaO, 30–50% ZnO, 15–50% $B_2O_3$, 2–15% $SiO_2$.

2. A glass as claimed in claim 1, wherein said glass has a softening point of 630° C. or less.

3. A glass as claimed in claim 1, which consists essentially of, by molecular percent, 10–30% BaO, 30–50% ZnO, 20–50% $B_2O_3$, 2–15% $SiO_2$.

4. A composition for use in formation of barrier ribs in a plasma display panel, comprising powder material wherein said powder material consists essentially of, by weight percent, 50–95% glass powder and 5–50% ceramic filler powder, said glass consisting essentially of, by molecular percent, 5–40% BaO, 30–50% ZnO, 15–50% $B_2O_3$, 2–15% $SiO_2$, said glass being PbO free and alkali metal oxide free and having a softening point of 630° C. or less.

5. A composition as claimed in claim 4, wherein said glass consists essentially of, by molecular percent, 10–30% BaO, 30–50% ZnO, 20–50% $B_2O_3$, 2–15% $SiO_2$.

6. A composition as claimed in claim 4, further comprising binder, plasticizer, and solvent to form a paste, said paste comprising, by weight, said powder material of 30–90%, said binder of 0.1–20%, said plasticizer of 0–10%, and said solvent of 10–30%.

7. A composition as claimed in claim 6, wherein said binder is at least one selected from a group of poly butyl methacrylate, polyvinyl butyral, poly methyl methacrylate, poly ethyl methacrylate, and ethyl cellulose, and said plasticizer is at least one selected from a group of butyl benzyl phthalate, dioctyl phthalate, di-isooctyl phthalate, dicapryl phthalate, dibutyl phthalate.

8. A composition as claimed in claims 6, wherein said solvent is at least one selected from a group of terpineol, diethylene glycol monobutyl ether acetate, and 2,2,4-trymethyl-1,3-pentanediolmonoisobutylate.

9. A composition as claimed in claim 4, further comprising binder and plasticizer to form a green sheet, said green sheet comprising, by weight, said powder material of 60–80%, said binder of 5–30%, and said plasticizer of 0–10%.

10. A composition as claimed in claim 9, wherein said binder is at least one selected from a group of poly butyl methacrylate, polyvinyl butyral, poly methyl methacrylate, poly ethyl methacrylate, and methyl cellulose, and said plasticizer is at least one selected from a group of butyl benzyl phthalate, dioctyl phthalate, di-isooctyl phthalate, dicapryl phthalate, dibutyl phthalate.

11. A composition as claimed in claim 4, wherein said ceramics filler powder is at least one selected from a group of alumina powder, zircon powder, zirconia powder titania, cordierite, mullite, silica, willemite, tin oxide, and zinc oxide.

* * * * *